United States Patent [19]

Akerberg

[11] Patent Number: 5,109,527
[45] Date of Patent: Apr. 28, 1992

[54] MOBILE RADIO COMMUNICATIONS METHOD AVOIDING UNNECESSARY TRANSMISSIONS IN ENVIRONMENT OF UNKNOWN CHANNEL ALLOCATION

[75] Inventor: Dag E. Åkerberg, Järfälla, Sweden

[73] Assignee: Telefonaktiebolaget L M Ericsson, Stockholm, Sweden

[21] Appl. No.: 578,244

[22] Filed: Sep. 6, 1990

[30] Foreign Application Priority Data

Sep. 13, 1989 [SE] Sweden .................... 8903031

[51] Int. Cl.5 .................... H04Q 7/00; H04B 7/204
[52] U.S. Cl. .................... 455/33.2; 370/95.3; 379/60; 455/34.1; 455/56.1
[58] Field of Search .................... 455/32, 33, 34, 49, 455/56, 62, 161, 166, 168, 179, 54, 67; 379/59, 60, 63; 370/95.1, 95.3, 110.1

[56] References Cited

U.S. PATENT DOCUMENTS 4,347,625  8/1982  Williams .
4,672,657  6/1987  Dershowitz .
4,775,998  10/1988  Felix et al. .
4,799,253  1/1989  Stern et al. .
4,905,301  2/1990  Krolopp et al. .................... 455/34

FOREIGN PATENT DOCUMENTS 175422  7/1989  Japan .

Primary Examiner—Reinhard J. Eisenzopf
Assistant Examiner—Chi H. Pham
Attorney, Agent, or Firm—Burns, Doane, Swecker & Mathis

[57] ABSTRACT

A method of communication in at least one cellular mobile radio system in an environment of additional mobile radio systems with mobile stations capable of communication with more than one of the systems on any of a predetermined group of radio channels, not all systems being capable and allowed to use all of the radio channels in the predetermined group, wherein all base stations transmit on at least one of the radio channels in the group information regarding system and base identity and the channels of the system, wherein a mobile station is prevented from transmitting on any of the radio channels until after receiving information on base and system identify and the channels of the system, and the allocation of a radio channel in the group for a call is determined by a mobile seizing an idle channel.

12 Claims, 4 Drawing Sheets

NORMAL SLOT

| 000001 | 18 BITS | |

FSIC

PAGING SLOT

| 000010 | 28 BITS | |

PSIC

SYSTEM INFORMATION

| 000011 | 32 BITS | |

SI

MOBILE RADIO COMMUNICATIONS METHOD AVOIDING UNNECESSARY TRANSMISSIONS IN ENVIRONMENT OF UNKNOWN CHANNEL ALLOCATION

TECHNICAL FIELD OF THE INVENTION

This invention relates to mobile radio systems. In particular the invention relates to a method of communication in at least one mobile radio system with dynamic channel allocation in an environment of additional mobile radio systems with dynamic channel allocation and mobile stations capable of cooperation with more than one of the systems.

BACKGROUND OF THE INVENTION

There are many kinds of cellular mobile radio systems. They may be grouped in various ways depending on various methods of operation. Of particular interest to the present invention is the method used for allotting a radio channel at call set up and handover and the interaction with adjacent or colocated other systems.

Originally cellular mobile radio systems had fixed radio channel reuse plans with fixed allocation of radio channels to base stations and cells. Later on dynamic channel allocation was suggested.

Dynamic Channel Allocation, DCA, has recently been acknowledged to be the only practical way to allocate channels for systems with very small cell sizes. Systems using DCA are for the time being mainly cordless telephone sets and systems, e.g.:

CEPT CT-1: Analog FDMA/FDD 900 MHz. Existing Digital

UK CT-2: FDMA/TDD 800 MHz. Interim '89, CAI-90

Swedish DCT: Digital Multicarrier (MC) TDMA/TDD 800 MHz 1990

ETSI DECT: Digital Multicarrier (MC) TDMA/TDD (1.6 GHz) 1992.

The small cells sizes open up possibilities to use very light weight pocket communication sets and at the same time provide extremely high traffic densities on a limited amount of spectrum.

DCA is also shown to be at least twice as freqency efficient as procedures with fixed frequency planning. Especially the TDMA in DCT and DECT gives very quick efficient and elegant procedures for DCA, flexible capacity, call set up and handover, without any need for complicated central control.

Finally DCA adjusts to local conditions and thus opens up new possibilities for shared services. This has been emphasized in a report on Cordless Telephone Product by the European Commission.

A first example is self organizing sharing and market driven capacity for systems performing to the same coexistance specification. The basic advantage is that different systems and system operators and different type of service (e.g. business, telepoint, residential) in a self organizing way, can utilize the same lump of available channels without prior distribution of channels to specific services or base stations. By having C/I limited cell range each service provider can, driven by the market development, increase the capacity by increasing his base station density.

A second example is radio links and a cordless telephone system, DCT, with DCA. The radio links can be fixed or mobile, military or civil. No cordless telephones, CT, are excepted to be in the link beam. The power of the CT is low, max 100 mW. Thus the radio links are not supposed to be interferred by the CT's. The possible interference from the radio links to the CT's will be very local. If the links are military, you do not know where or when or on which exact frequency the interference will occur. A CT, like DCT, with several 1 MHz carriers, will with DCA, adjust locally to the useful carriers. Thus DCT and radio links can coexist well, without detailed prior knowledge of the local situation.

Due to the nature of DCA it is good not to depend on a fixed or special signalling channel e.g. for system information to provide means for a roaming portable to connect to the system. Because that signalling channel has not guaranted protection against interference, and a fixed channel would spoil the concept of free DCA. It is also not good, if a portable which does not know on which channels his wanted system is operating on, pollutes the air in more or less blind trials to get a response from it.

For a PAN European System for instance, a portable may be able to operate on the whole available frequency band, but different countries have not been able to free the whole band. In a specific country or part of a country, for instance part of the band may be occupied by a sensitive TV link. The fixed stations in this country can easily be programmed not to use that part of the band. But roaming portables must be prohibited to transmit in that part.

Thus there is a need for recognition of channels used by a wanted system.

SUMMARY OF THE INVENTION

Simulations and practical tests of digital cellular radio systems show that DCA works very well if the concept is designed without use of specific signalling channels. The present invention gives a solution to the problem for a portable to find a wanted system, operating on an unknown part of the allocated band, and not start any transmissions without having received information on which channels are allowed to use, and on suitable call set u channel selection.

In a method according to the invention each cell in every system is always active on at least one channel. By letting at least one channel always be active on each fixed station of a system (the last communication channel stays on), a portable has always something to listen to in each cell. On every active cell a small part of the capacity is devoted for broadcasting system information regarding identity, channels used, order in which base station scans channels for incoming calls etc. This simplifies for a roaming portable to find the system, and quickly synchronize and connect to it without polluting the air with a number of more or less well targeted transmissions trying to find it.

A method according to the invention means that telecommunication systems with dynamic channel allocation operatable over a relatively wide band (10–20 Mhz) have large advantages in that different services and systems can operate on the band without prior frequency planning and distribution of different channels to different users or services or systems. Every system adjusts to the local situation and choses channels that for the time being are free.

DESCRIPTION OF PREFERRED EMBODIMENTS

Figure 1:
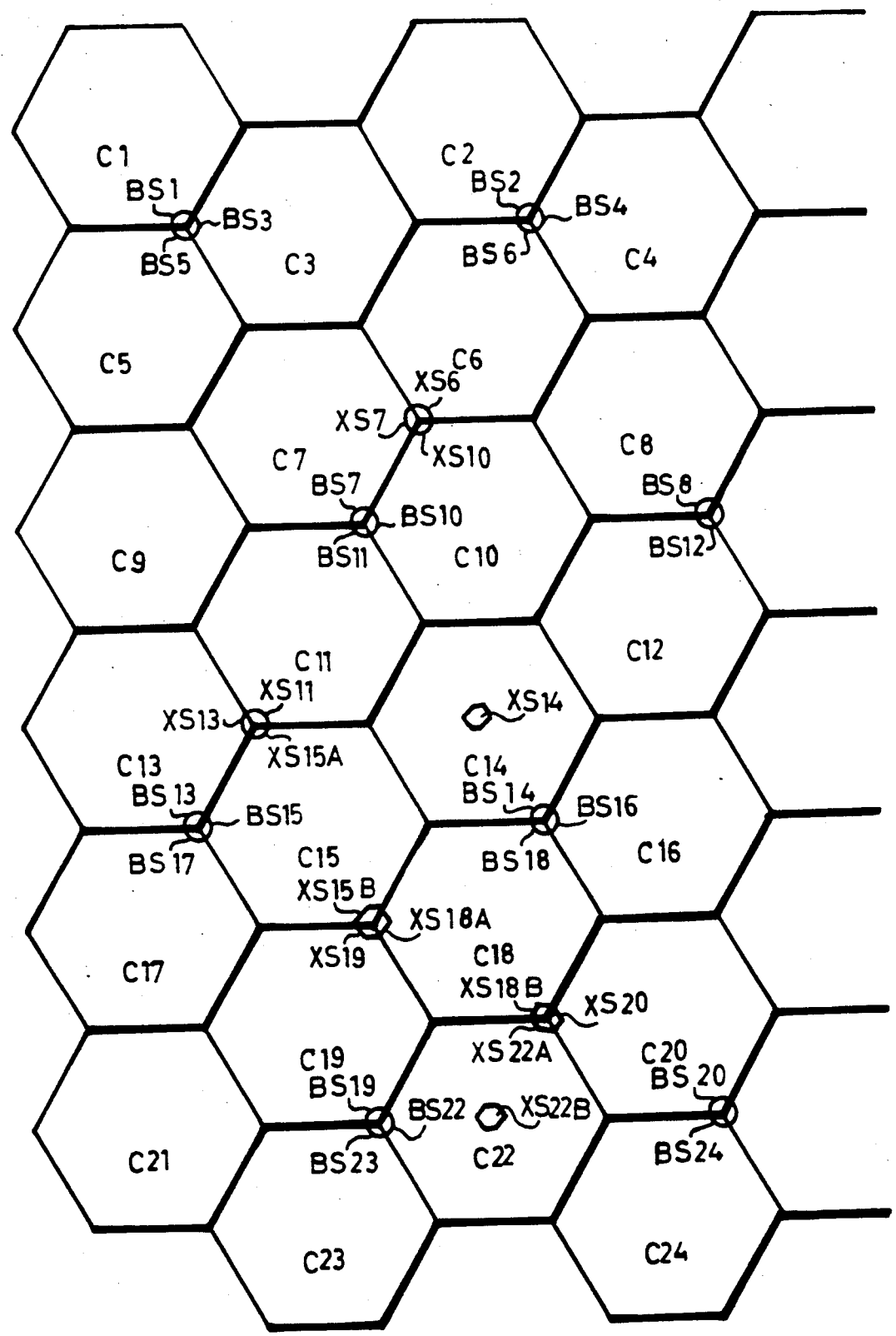
FIG. 1 illustrates a cellular mobile radio system in an environment of a plurality of other cellular mobile radio systems.

Illustrated in FIG. 1 are a plurality of cells C1 to C24. For each cell there is a base station BS1 to BS24 for communication with mobile stations. The cells and corresponding base stations BS1 to BS24 may constitute parts of one or more cellular mobile radio systems. E.g. cells C1 to C8 and base stations BS1 to BS8 may belong to a first system, cells C10 to C17 and base stations BS10 to BS17 may belong to a second system while cells C18 to C24 and base stations BS18 to BS24 may belong to a third system.

Each mobile radio system also comprises at least one mobile switching centre MSC or base station controller BSC not illustrated in FIG. 1. Among all the base stations BS1 to BS24 those belonging to one system are connected to a mobile switching centre or base station controller of that system, e.g. by cables or fixed radio links not illustrated in FIG. 1. E.g. base stations BS1 to BS8 may be connected to a first mobile switching centre MSC1, base stations BS10 to BS17 may be connected to a second mobile switching centre MSC2 while base stations BS18 to BS24 may be connected to a third mobile switching centre MSC3.

Illustrated in FIG. 1 are also a plurality of base stations XS6, XS7, XS10, XS11, XS13, XS15A, XS15B, XS18A, XS18B, XS19, XS20, XS22A and XS22B belonging to a particular mobile radio system also serving the cells C6, C7, C10, C11, C13, C14, C15, C18, C19, C20 and C22. The base stations XS6, XS7, XS10, XS11, XS13, XS15A, XS15B, XS18A, XS18B, XS19, XS20, XS22A and XS22B are all connected by cables or radio links to a particular mobile switching centre MSCX, not illustrated in FIG. 1.

The mobile radio systems of base stations BS1 to BS24 and XS7 to XS22B and cells C1 to C24 are all digital TDMA systems where the base stations and the served mobile stations transmit and receive radio signals in time slots on a plurality of radio channels. Mobile stations served by the systems are designed for operation on any of a plurality of radio channels in a predetermined group of radio channels. For various reasons, however, not all of the systems are capable or allowed to operate on any of the radio channels in the predetermined group of radio channels. E.g. the first and third systems comprising BS1 to BS8 and BS18 to BS24 may both be capable and allowed to operate on all radio channels in the predetermined group. The second system comprising the base stations BS10 to BS16 may not be capable of operation on all of the radio channels in the predetermined group but only be capable of operating on a second subgroup. The particular system may be capable of operating on all radio channels in the predetermined group but not allowed to operate on some of the radio channels in order to avoid interference with other radio communication.

None of the mobile radio systems comprising the cells C1 to C24 illustrated in FIG. 1 have a fixed frequency reuse plan with fixed allocation of channels to cells and base stations. Instead all of the systems comprising the cells C1 to C24 practice dynamic channel allocation. Due to the dynamic channel allocation none of the systems have a radio channel exclusively reserved for access or paging or control purposes but paging of mobile stations and system information for roaming mobiles etc are transmitted on the radio channels for calls.

Figure 2:
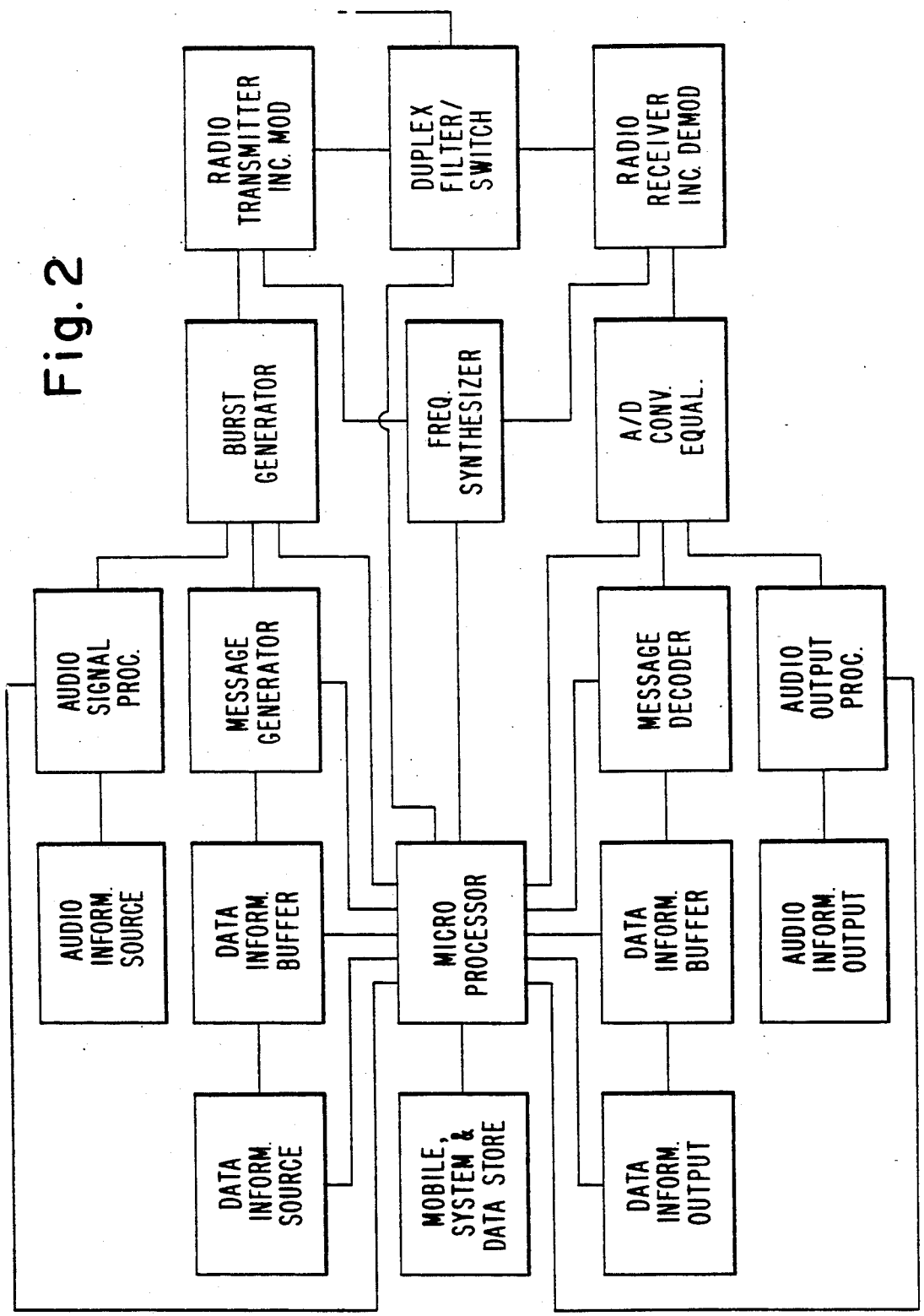
FIG. 2 illustrates a mobile radio station for communication with fixed radio stations in a cellular mobile radio system.
Figure 3:
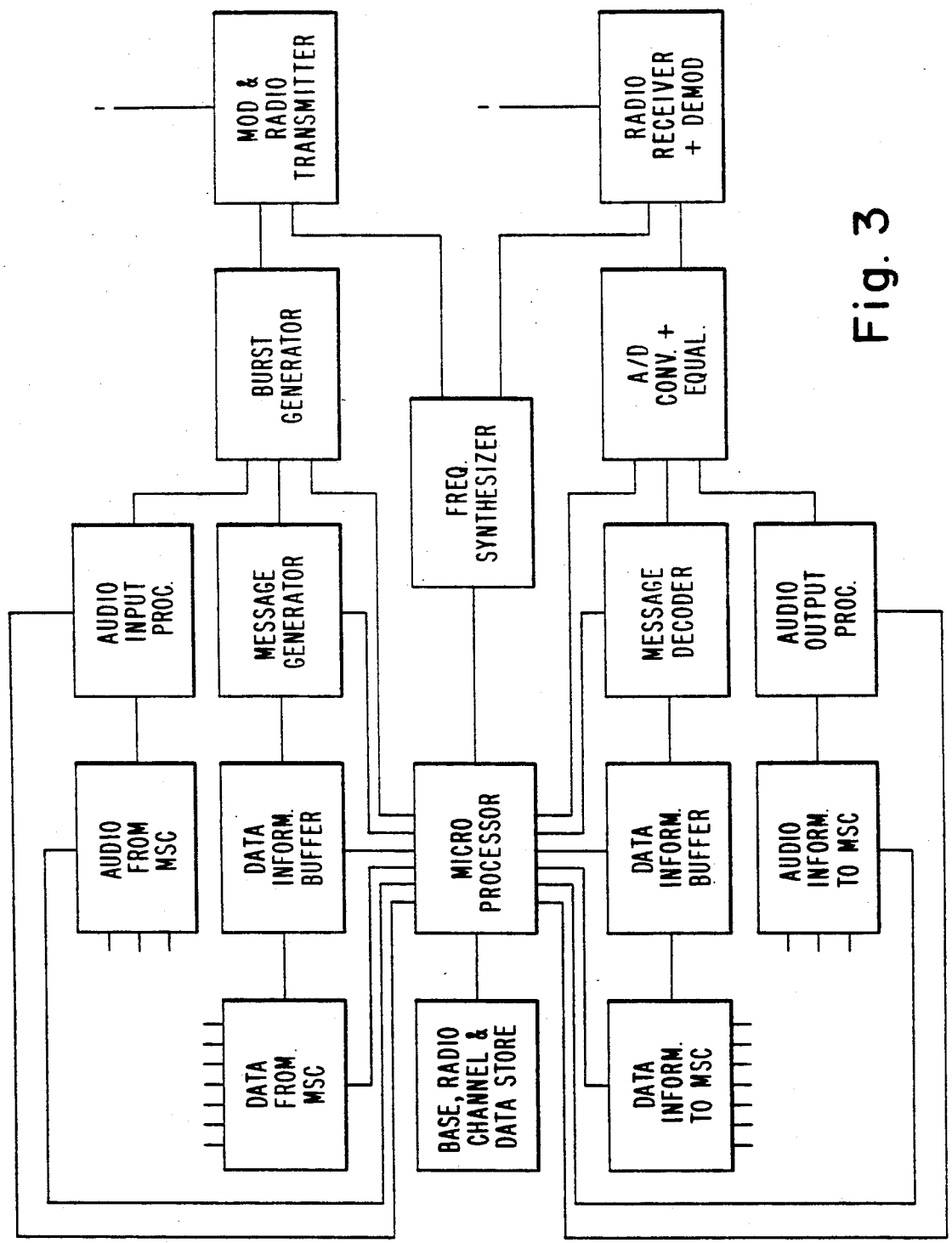
FIG. 3 illustrates a fixed radio station for communication with mobile radio stations in a cellular mobile radio system.

FIG. 2 illustrates a block diagram of a mobile station and FIG. 3 illustrates a block diagram of a base station for use in any of the cellular mobile radio systems according to FIG. 1 in connection with a method according to the present invention. The base and mobile stations are designed for transmission of bursts in time slots of a selected communication radio channel that is shared by plural stations in time multiplex and for receiving bursts transmitted by other stations in such time slots. The time slots may be used e.g. substantially for a normal full duplex telephone call or substantially for digital message communication or for both simultaneously. Although a base station normally comprises means enabling it to simultaneous transmission and reception on more than one selectable radio channel, the apparatus required for simultaneous transmission and reception on plural radio channels are substantially duplicates of the apparatus for one selectable radio channel and for reasons of space only means for communication on one selectabel radio channel at a time are illustrated in FIG. 3.

Both base and mobile station comprise a micro processor controlled radio transmitter (including modulator) and a microprocessor controlled radio receiver (including demodulator). The radio transmitter transmits radio signals modulated with digital signals from a burst generator. The burst may comprise audio signals from an audio signal processing means and digital messages generated by a message generator. In the mobile the audio signal processor is connected to an audio information source, e.g. a microphone, while the message generator is connected to a data information source, e.g. a keyboard, via a data information buffer.

In the base the audio signal processing means is instead connected to an audio line terminal receiving audio information from the MSC to which the audio terminal is connected by radio link or cables. The message generator of the base is via a data information buffer connected to a data line terminal receiving data from the MSC to which the data line terminal is connected by radio link or cables.

The radio receiver of base and mobile is connected to a an analog to digital converter and possibly also an optional equalizer. The analog to digital converter and optional equalizer is connected to a message decoder for detecting messages received bursts and to an audio output processor for audio information in received bursts.

In the mobile the message decoder is connected to a data information output means, e.g. a display, via a data information buffer, while the audio output processor is connected to an audio information output means, e.g. a loudspeaker.

In the base the message decoder is instead connected via a data information buffer to a data line terminal supplying data to the MSC to which the data terminal is connected by radio link or cables, while the audio output processor is connected to an audio line terminal supplying audio information to the MSC to which the audio line terminal is connected.

The radio channel on which the base or mobile radio transmitters and receivers operate is determined by frequencies supplied from a frequency synthesizer controlled by the microprocessor. Finally the base and mobile comprises data store means for storing information on the particular system, base and mobile station, radio channels, frame and time slot format, message formats, error protecting codes, algorithms for operation of station etc.

The microprocessor is connected to the store and almost all blocks for controlling and timing their operation, for supplying information, e.g. from the store, to be incorporated in bursts to be transmitted, and for receiving information from received bursts, e.g. for control purposes or for storing in the store.

Figure 4:
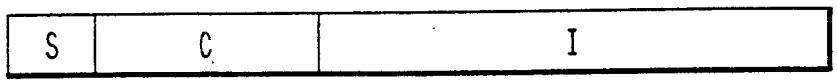
FIG. 4 illustrates the transmission of digital information divided into blocks or fields.

FIG. 4 illustrates a transmission from a base or mobile station. The digital transmission is generally divided into some kind of blocks each having synchronization bits, S, a control field, C, and an information field for speech or data, I.

Figure 5:
FIGS. 5 and 6 illustrates embodiments of subdivision of one of the blocks or fields of a transmission according to FIG. 4.

FIG. 5 illustrates a C field. The C field contains header, H, fixed station identity, FSID, and some other information. An idle unlocked portable can regularily scan all available channels and if within reach of a cell he will detect an active channel and if FSID is the ID of a system it wants to connect to, the portable will lock itself on this channel.

Thus every portable within reach of a wanted system is in locked idle mode and is locked to an arbitrary (strongest) active channel on any of the base stations.

Figure 6:
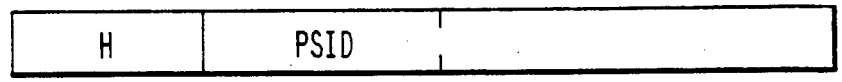

When the mobile switching cente wants to connect to a portable, the header, H, is changed, and FSID is exchanged with a portable station ID, PSID, in the C field of every active channel. FIG. 6 illustrates such a C field when broadcast paging is transmitted.

In this way every idle locked portable station, PS, no matter on which channel of FS it is locked to, will receive the PSID.

The paged portable will then listen for a free channel and respond on that channel to the FS that it is locked to. This is described in U.S. Pat. No. 4731812 and European Patent Application No. 226610. There it is assumed that the portable, knows beforehand (it is programed into it) on which channels the system is allowed to operate and is listening for incoming calls.

The new problem that has to be solved is for roaming portables, when it is not known on which set of channels the system operates. It is also probable that a fixed station does not have enough receivers to listen simultaneously on all free channels for an incoming call (no special signalling channel exists). Thus the portable also needs information on in which order scanning of free channels are made, in order to avoid polluting with blind connection trials.

Thus in order to improve the basic DCA concept of shared services when roaming protables are used the invention proposes that required additional system information is broadcasted on every active channel, and that no portable is allowed to transmit before it has locked to an active channel and received this system information.

The FSID is also a system information, but it has to be sent regularly, because PS in idle lock or in communication regularily checks the field strenght and the identity of other active channels. If transmission from an other own FS is stronger than the own FS, an handover is made to the new FS.

But the extra System Information SI telling on which set of channels the system is allowed to choose etc is only needed when a portable locks to the system.

The SI information shall contain the following information:
A. Which set of channels the system uses.
B. Order and time intervalls when FS scan free channels.
C. Actual channel number on channel locked to.

The invention is applicable to different kind of radio multiple access methods FDMA or TDMA for instance.

Figure 7:
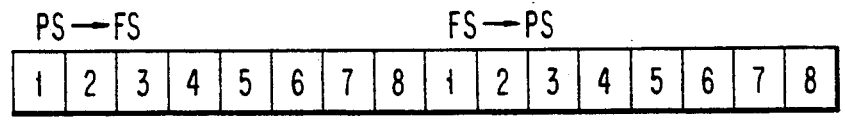
FIG. 7 illustrates a TDMA radio channel frame with 16 time slots.

An example is a multicarrier (4-10 CARRIERS) TDMA system where each carrier occupies 1 MHz and has 8 time duplex slots per carrier, and a frame cycle time of 16 ms. FIG. 7 illustrates such a TDMA radio channel frame with 8 times slots for transmission in the direction from portable (mobile) to fixed (base) station and 8 time slots for transmission in the direction from fixed to portable station.

Figure 8:
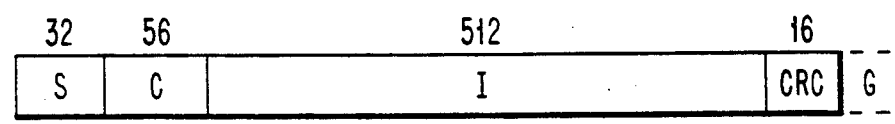
FIG. 8 illustrates the structure of transmission in a time slot of a TDMA frame according to FIG. 7.

FIG. 8 illustrates the structure of a time slot in a TDMA frame according to FIG. 7. The number of bits transmitted in a burst in the slot is indicated. CRC are check bits and G is guardspace to next slot. The carried speech or data is in the information field I.

Figure 9:
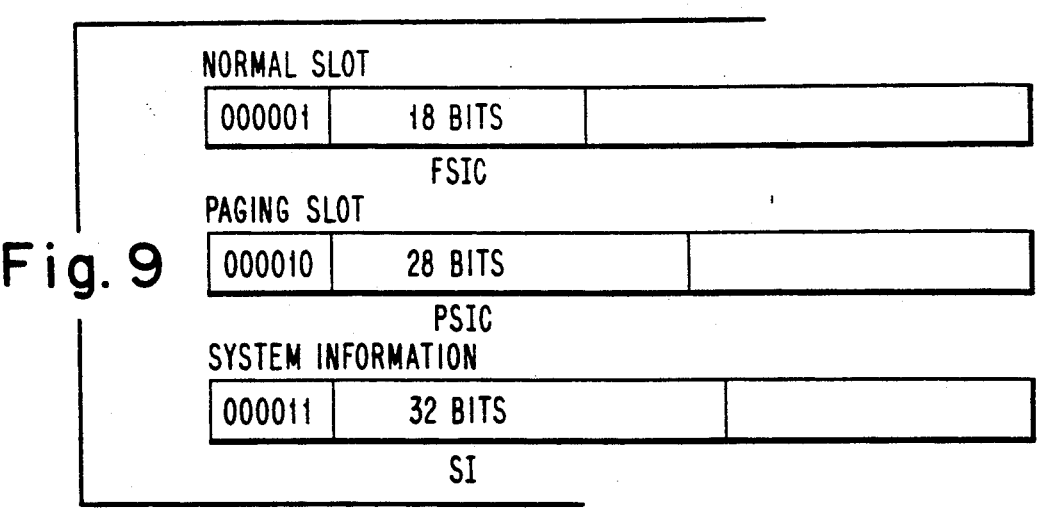
FIG. 9 illustrates embodiments of a C-field in a time slot according to FIG. 8 for a normal slot, a paging slot and a system information slot, respectively.

The C field will contain different information following different 6 bit headers as illustrated in FIG. 9 for a normal slot, a paging slot and a system information slot. FIG. 9 also illustrates examples of C-field information. The SI information can e.g. look;

| | |
|---|---|
| Used carriers of 10 | 10 bits |
| Actual carrier | 4 bits |
| Actual slot | 4 bits |
| Reference for scannning free channels at FS | 12 bits (for up to 3 parallell receivers) |
| Spare | 2 bits |

All active slots normally have the Normal in the C-field. That is exchanged to paging, when broadcast paging is needed, and to system information when SI is broadcasted. SI is as earlier mentioned not needed very often, perhaps every 16th or 32th frame corresponding to every quarter half second.

Reference and order of scanning free channels at FS is especially applicable when the FS is a single radio tranceiver for 8 duplex slots TDMA and can change carrier from slot to slot.

This is a very economic and powerfull solution that also avoid intermodulation and adjacent carrier interference between portables connected to the same base.

This is described in Swedish Patent Application No. 8803696-7.

The receiver of this base station can only scan for incoming calls on free channels at one time slot at a time, and will scan all time slots on one carrier and than all on the next carrier etc. The FS will scan the carriers in order. The reference tell which carrier in scanned during the actual frame. To get quicker access time the FS can have up to three parallell scanning receivers, starting at different references. 4 bits are needed per reference 0000,0000,0000 3 times 4 bits have been assigned. 0000 means no more parallell receiver.

Figure 10:
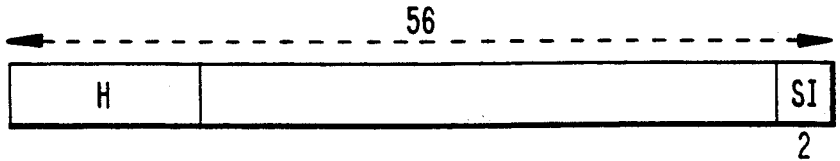
FIG. 10 illustrates an alternative embodiment of a C-field of a time slot according to FIG. 8.

An alternative to the SI header is to have e.g. 2 SI bits in every active slot and frame, see FIG. 10. FIG. 10 illustrates a C-field with 2 SI bits. In this case after 16 frames, 256 ms, all 32 SI bits have been transmitted.

The broadcasted SI could in principle also contain other system information, as services available by the system and e.g. an FS dependent part telling which channels are regarded free at that specific FS. These are not included, since it is important to keep the broad casted information as short as possible, no to steel capacity. There are other better ways.

The invention is not restricted to embodiments described. In particular the invention is not restricted to descibed TDMA systems but may also be implenmented in FDMA systems.

I claim:

1. A method of communication in a particular mobile radio system in an environment of another mobile radio communication system, where each system comprises plural fixed radio stations and shares a predetermined group of radio channels for calls and may serve a plurality of mobile radio stations, the mobile stations capable of operating on any of the predetermined radio channels but not all systems being able and allowed to use all radio channels in the predetermined group for calls, said another mobile radio communication system also being able and allowed to use for calls at least some of the radio channels the particular system is able and allowed to use for calls, comprising the steps of:

transmitting from each fixed station in the particular system, on at least one of the radio channels in the predetermined group allowed to be used for calls in the particular system but not known in advance to said mobile stations, information identifying said fixed station and identifying the particular system and which radio channels the particular system is able and allowed to use for calls;

scanning at mobile stations channels in the predetermined group for receiving said information identifying said fixed station and identifying the particular system and which channels the particular system is able and allowed to use for calls;

preventing any mobile station from transmitting on any of the radio channels in the predetermined group until after receiving information on the channels allowed to be used for calls in the system serving the mobile; and dynamically allotting the channels the particular system is able and allowed to use for cells by seizing at mobile stations served by the fixed stations of the particular system a free channel at call set up or handover.

2. A method according to claim 1 comprising the additional step of:

transmitting from each fixed station of the particular system, on at least one of the radio channels the particular system is able and allowed to use for calls, information on channel identity and the order in which the fixed station scans free channels among the allowed channels for possible radio signals from mobile stations seizing the free channels.

3. The method of claim 2 wherein said information on channel identity and the order in which the fixed station scans free channels is transmitted from each fixed station on each active channel.

4. A method of communication in a combination of a plurality of cellular mobile radio communication systems each comprising plural fixed radio stations, a predetermined group of radio channels for calls shared by the systems and a plurality of mobile radio stations, the mobile stations capable of operating on any of the predetermined radio channels but not all systems being able and allowed to use all radio channels in the predetermined group, at least some of the radio channels one of the systems is able and allowed to use for calls another of the systems also is able and allowed to use for calls, comprising the steps of:

transmitting from each fixed station on at least one of the radio channels in the predetermined group to be used for calls but not known in advance to said mobile stations information identifying said fixed station and a system of said fixed station and which of the predetermined radio channels the system of fixed station is able and allowed to use for calls;

scanning at each mobile channels in the predetermined group for receiving said information identifying said fixed station and the system of said fixed station and which of the predetermined radio channels the system of said fixed station is able and allowed to use for calls;

preventing each mobile station from transmitting on any of the radio channels in the predetermined group until after receiving information on the channels allowed to be used for calls in the system serving the mobile; and at call set up and handover dynamically allocating the channels each system is able and allowed to use for calls by seizing at mobile stations served by the fixed stations of the system a free channel among the allowed channels in the group.

5. A method according to claim 4 comprising the additional step of:

transmitting from each fixed station, on at least one of the radio channels its system is able and allowed to use for calls, information on channel identity and the order in which the fixed station scans free channels of the allowed channels for radio signals from mobile stations seizing the free channels.

6. The method of claim 5 wherein said information on channel identity and the order in which the fixed station scans free channels is transmitted from each fixed station on each active channel.

7. A method of operating a particular mobile radio system without dedicated control radio channel in an environment of another mobile radio communication system, where each system comprises plural fixed radio stations and shares a predetermined group of communication radio channels for calls and may serve a plurality of mobile radio stations, the mobile stations capable of operating on any of the predetermined radio channels but not all systems being able and allowed to use all radio channels in the predetermined group for calls, said another mobile radio communication system also being able and allowed to use for calls at least some of the radio channels the particular system is able and allowed to use for calls, comprising the steps of:

transmitting from each fixed station in the particular system, on at least one of the radio channels in the predetermined group allowed to be used for calls in the particular system but not known in advance to said mobile stations, information identifying said fixed station and identifying the particular system and which radio channels the particular system is able and allowed to use for calls;

scanning at mobile stations channel sin the predetermined group for receiving said information identifying said fixed station and identifying the particular system and which radio channels the particular system is able and allowed to use for calls;

preventing any mobile station from transmitting on any on the radio channels in the predetermined group until after receiving information on the channels allowed to be used for calls in the system serving the mobile; and dynamically allotting the channels the particular system is able and allowed to use for calls by seizing at mobile stations served by the fixed stations of the particular system a free channel at call set up or handover.

8. A method according to claim 7 comprising the additional step of: transmitting from each fixed station of the particular system, on at least one of the radio channels the particular system is able and allowed to use for calls, information on channel identity and the order in which the fixed station scans free channels of the allowed channels for possible radio signals from mobile stations seizing the free channels.

9. The method of claim 8 wherein said information on channel identity and the order in which the fixed station scans free channels is transmitted from each fixed station on each active channel.

10. A method of operating a combination of a plurality of cellular mobile radio communication systems without control radio channels and each comprising plural fixed radio stations, a predetermined group of communication radio channels for calls shared by the systems, and a plurality of mobile radio stations designed to be able to cooperates with at least two of the systems, the mobile stations capable of operating on any of the predetermined radio channels but not all systems being able and allowed to use all radio channels in the predetermined group, another of the systems also being able and allowed to use for calls at least some of the radio channels one of the systems is able and allowed to use for calls, comprising the steps of:

transmitting from each fixed station on at least one of the radio channels in the predetermined group to be used for calls but not known in advance to said mobile stations, information on identifying said fixed station and a system of said fixed station and which of the predetermined radio channels the system of the fixed station is able and allowed to use for calls;

scanning at each mobile channels in the predetermined group for receiving said information identifying said fixed station and the system of said fixed station and which of the predetermined radio channels the system of the fixed station is able and allowed to use for calls;

preventing each mobile station from transmitting on any of the radio channels in the predetermined group until after receiving information on the channels allowed to be used for calls in the system serving the mobile; and at call set up and handover dynamically allocating the channels each system is able and allowed to use for calls by seizing at mobile station served by the fixed stations of the system a free channel among the allowed channels in the group.

11. A method according to claim 10 comprising the additional step of:

transmitting from each fixed station, on at least one of the radio channels its system is able and allowed to use for calls, information on channel identity and the order in which the fixed station scans free channels of the allowed channels for radio signals from mobile stations seizing the free channels.

12. The method of claim 11 wherein said information on channel identity and the order in which the fixed station scans free channels is transmitted from each fixed station on each active channel.

* * * * *